(12) United States Patent  (10) Patent No.: US 8,619,528 B2
Ghazvini et al.  (45) Date of Patent: Dec. 31, 2013

(54) METHOD AND SYSTEM FOR OPTICAL CALIBRATION

(75) Inventors: Hamid Ghazvini, San Jose, CA (US); David Kuo, Palo Alto, CA (US); Minh Huong Le, San Jose, CA (US); Kim Yang Lee, Fremont, CA (US); HongYing Wang, Fremont, CA (US); Nobuo Kurataka, Campbell, CA (US); Yautzong Hsu, Fremont, CA (US); Henry Hung Yang, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 56 days.

(21) Appl. No.: 13/223,199

(22) Filed: Aug. 31, 2011

(65) Prior Publication Data

US 2013/0051206 A1  Feb. 28, 2013

(51) Int. Cl.
*G11B 20/00* (2006.01)

(52) U.S. Cl.
USPC ............... 369/53.1; 369/44.26; 356/237.3; 264/293

(58) Field of Classification Search
USPC ......... 369/14, 44.26, 44.34, 53.1; 360/55, 25; 356/237.3, 237.2, 51, 369; 264/293; 427/277
See application file for complete search history.

(56) References Cited

U.S. PATENT DOCUMENTS

| | | | |
|---|---|---|---|
| 5,339,204 A * | 8/1994 | James et al. | 360/51 |
| 5,677,765 A | 10/1997 | Laird et al. | |
| 6,781,103 B1 | 8/2004 | Lane et al. | |
| 6,898,037 B2 * | 5/2005 | Leigh et al. | 360/55 |
| 7,027,252 B2 | 4/2006 | Cosci et al. | |
| 7,075,741 B1 | 7/2006 | Soetarman et al. | |
| 7,123,357 B2 | 10/2006 | Meeks | |
| 7,397,621 B2 | 7/2008 | Hou et al. | |
| 2012/0182542 A1 * | 7/2012 | Walsh et al. | 356/51 |
| 2013/0143002 A1 * | 6/2013 | Kurataka et al. | 428/172 |

* cited by examiner

*Primary Examiner* — Ali Neyzari

(57) ABSTRACT

A system and method of calibrating optical measuring equipment includes optically measuring discrete objects of a first known predictable pattern from a calibration apparatus, wherein the first known predictable pattern is a bit pattern. A recording surface optical reader is calibrated based on the optically measuring. Using the first known predictable pattern, contamination is filtered from the results of the optically measuring.

20 Claims, 6 Drawing Sheets

METHOD AND SYSTEM FOR OPTICAL CALIBRATION

FIELD

Embodiments according to the present invention generally relate to bit patterned media.

BACKGROUND

In magnetic recording media, information is written to and read from a recording medium. For example, disk drives may include one or more hard disks, which may be fabricated on production lines.

A hard disk is an apparatus including multiple layers established upon a substrate. For example, a seed layer may be established overlying the substrate. A base layer may be established overlying the seed layer. Perpendicular magnetic recording islands are recording areas that may be established in the base layer and on the seed layer.

Visual inspection tools are used for media production. For example, Candela tools may monitor processes and defect control of hard disk fabrication. The visual inspection tools visually examine a substrate surface, for example the surface of the hard disk, after each layer is established. However, prior to monitoring the hard disk fabrication, the visual inspection tools may need to be reliably and accurately calibrated.

BRIEF DESCRIPTION OF THE DRAWINGS

Embodiments of the present invention are illustrated by way of example, and not by way of limitation, in the figures of the accompanying drawings.

DETAILED DESCRIPTION

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

For expository purposes, the term "horizontal" as used herein refers to a plane parallel to the plane or surface of a substrate, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

Embodiments of the present invention provide methods and systems for calibrating optical measuring equipment, for example Candela tools. However, embodiments of the present invention can be applied to any visual inspection tool that requires calibration. In an embodiment, bit patterned media ("BPM") fabrication techniques may be used to create calibration apparatuses, for example calibration disks. The BPM calibration disks may be used to calibrate a number of Candela tools. For example, the Candelas may optically read a known predetermined predictable pattern that has been formed on the BPM calibration disks. The results of the readings are then used to calibrate the Candelas to each other.

Figure 1:
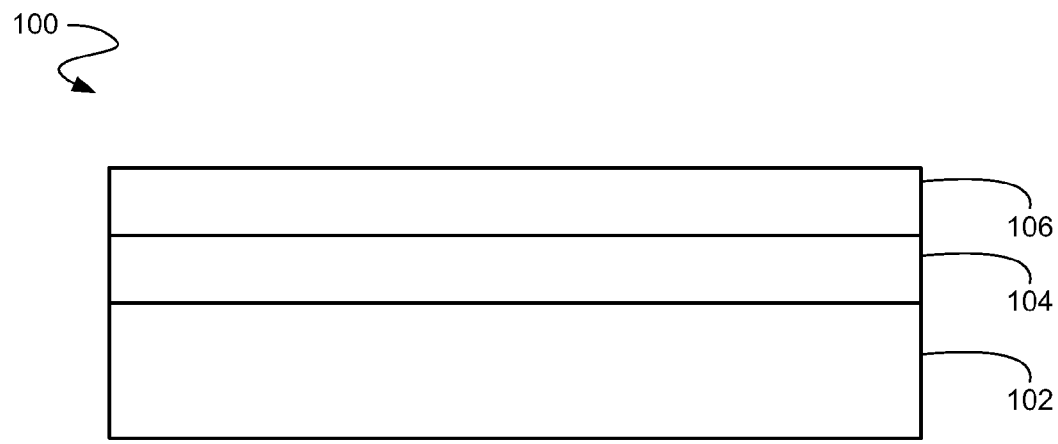
FIG. 1 is a simplified cross-sectional view of the fabrication of a portion of a template, according to an embodiment of the present invention.

FIG. 1 is a simplified cross-sectional view of the fabrication of a portion of a template 100, according to an embodiment of the present invention. The template 100 includes a substrate 102, a first layer 104, and a resist layer 106. In an embodiment, the substrate 102 may be, for example, a 525 µm layer of quartz.

In an embodiment, the first layer 104 may be deposited on the substrate 102, for example by physical vapor deposition (PVD), chemical vapor deposition (CVD), sputtering, etc. The first layer 104 may be, for example, a 5 nm layer of Cr. The resist layer 106 may be deposited on the first layer 104, for example by spin coating. In some embodiments the resist layer 106 may be a positive E-beam resist, for example ZEP.

Figure 2:
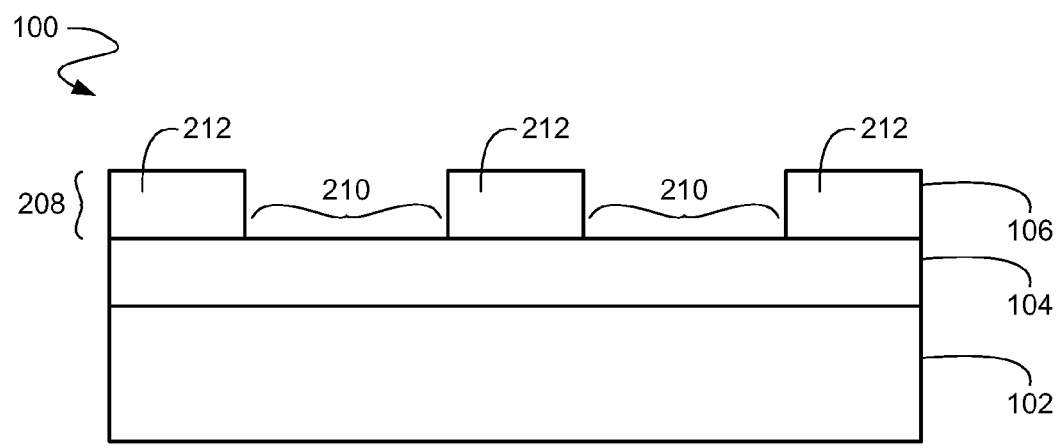
FIG. 2 is a simplified cross-sectional view of the fabrication of a portion of the template after a first pattern has been formed in the resist layer, according to an embodiment of the present invention.

FIG. 2 is a simplified cross-sectional view of the fabrication of a portion of the template 100 after further processing, according to an embodiment of the present invention. A first pattern 208 has been formed in the resist layer 106. For example, e-beam lithography may be used for "exposing" the portions 210 of the resist layer 106 and then selectively removing the exposed portions by "developing", thus leaving the first pattern 208 of the unexposed portions 212 of the resist layer 106 and selectively uncovering the underneath first layer 104.

Figure 3:
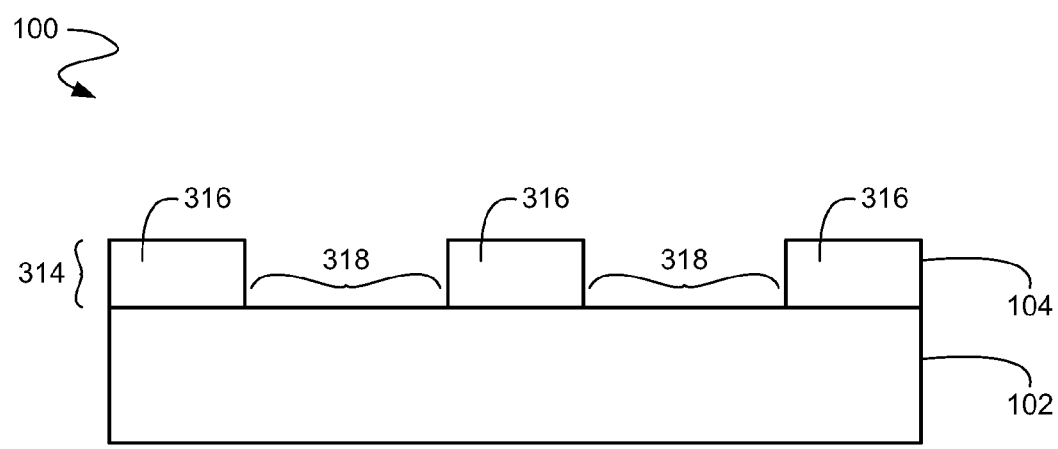
FIG. 3 is a simplified cross-sectional view of the fabrication of a portion of the template after a second pattern as been formed in the first layer, according to an embodiment of the present invention.

FIG. 3 is a simplified cross-sectional view of the fabrication of a portion of the template 100 after further processing, according to an embodiment of the present invention. A second pattern 314 has been formed in the first layer 104. In an embodiment the second pattern 314 may correspond to the first pattern 208 (FIG. 2). The second pattern 314 may be formed, for example, by using e-beam unexposed portions 212 (FIG. 2) of the resist layer 106 (FIG. 2) as etching masks and etching the exposed portions 210 (FIG. 2) of the first layer 104. Thus after etching, the remaining portions 316 of the first layer 104 and exposed areas 318 of the substrate 102 remain.

Figure 4:
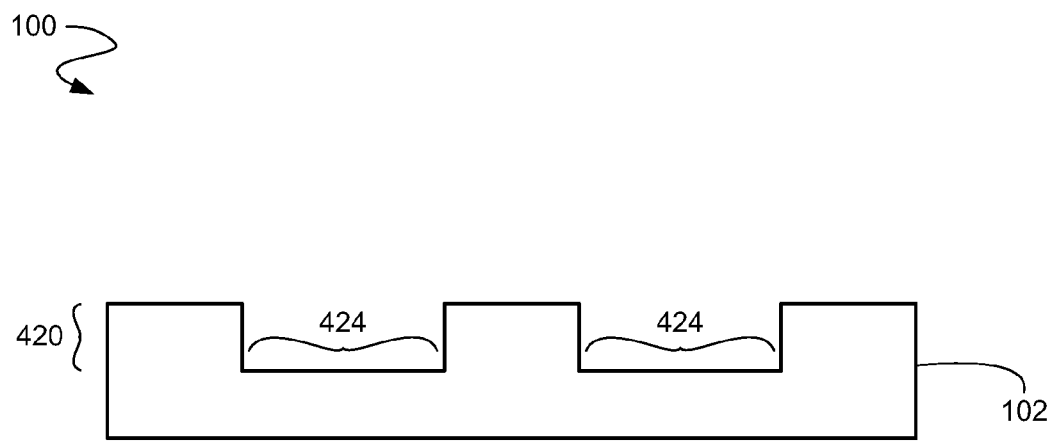
FIG. 4 is a simplified cross-sectional view of the fabrication of a portion of the template after a third pattern has been formed in the substrate.

FIG. 4 is a simplified cross-sectional view of the fabrication of a portion of the template 100 after further processing.

A third pattern 420 has been formed in the substrate 102. In an embodiment the third pattern 410 may correspond to the first pattern 208 (FIG. 2) and/or the second pattern 314 (FIG. 3). The third pattern 420 may be formed, for example, by using the remaining portions 316 (FIG. 3) of the first layer 104 (FIG. 3) as etching masks and etching the exposed areas 318 (FIG. 3) of the substrate 102. Thus, the remaining portions 316 (FIG. 3) of the first layer 104 (FIG. 3) mask portions of the substrate, and the etching forms depressions 424 in the substrate 102. Therefore the template 100 thus fabricated has a depression pattern in the substrate, e.g. a "hole tone template".

In some embodiments, a "liftoff" process may be used to fabricate template 100. The template thus formed has a protrusion pattern on the substrate, e.g. a "pillar tone template".

Figure 5:
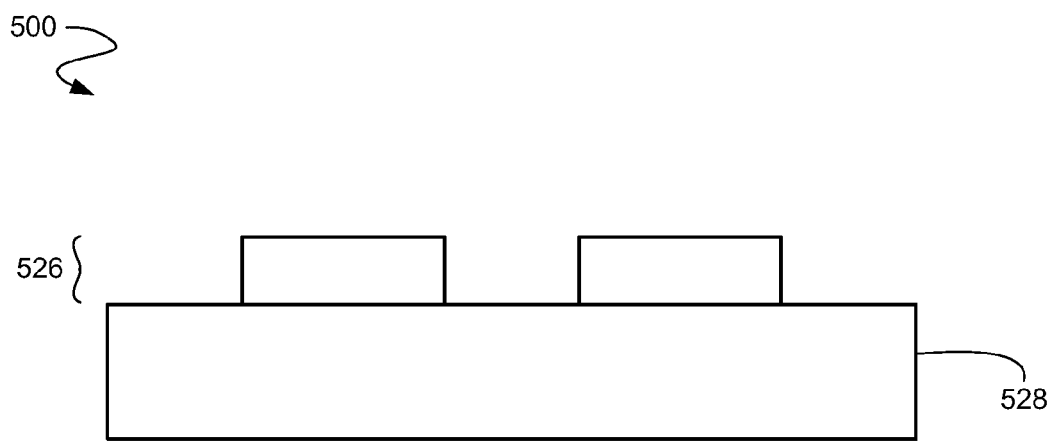
FIG. 5 is a simplified cross-sectional view of a portion of a calibration tool, according to an embodiment of the present invention.

FIG. 5 is a simplified cross-sectional view of a portion of a calibration tool 500, according to an embodiment of the present invention. In an embodiment the calibration tool 500 may be a disk including a known predetermined predictable pattern 526 of elements, either raised or depressed. The pattern 526 can be either the pillars on top of the substrate surface or holes (depressions) under the substrate surface. Unlike a random pattern of elements distributed on a substrate, the known predetermined predictable pattern 526 has been fabricated (as described above) from an identified design that may be recorded and stored prior to scanning by optical equipment 800 (See FIG. 8). Thus for example, the calibration tool 500 may be used to calibrate the optical equipment 800 (See FIG. 8), e.g. Candela equipment, by comparing the known predetermined predictable pattern 526 to scans taken by the optical equipment 800 (See FIG. 8).

In an embodiment the template 100 (FIG. 4) may be used to form one or more calibration tools 500. For example, in some embodiments the template 100 (FIG. 4) may be used to form the calibration tool 500 using imprint lithography. In steps not shown, a resist is coated or dispensed onto a substrate 528. The substrate 528 may be one that is commonly used as hard drive media. For example, the substrate 528 may be fabricated from aluminum and coated with a layer of nickel phosphorus. Magnetic layers and carbon overcoat could be deposited on the substrate. However, it will be appreciated that the substrate 528 can also be fabricated from other materials, such as glass and glass containing materials, with full magnetic media stacks and carbon layer coated on top of it.

In steps not shown, the template 100 (FIG. 4 as a hole tone template) is then pressed into the resist forming the known predetermined predictable pattern 526. The resist is hardened, for example by thermal or any electromagnetic energy such as UV, and the template 100 (FIG. 4) is removed, leaving the known predetermined predictable pattern 526 on the substrate 528. In an embodiment, the known predetermined predictable pattern 526 is a negative image of the third pattern 420 (FIG. 4). Similarly, if the template 100 is a pillar tone template, a hole tone pattern will be formed on the substrate 528.

Figure 6:
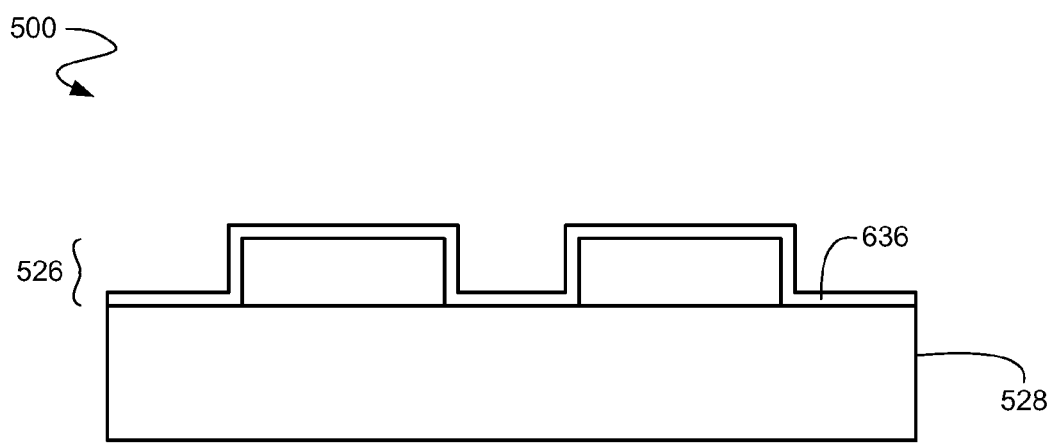
FIG. 6 is a simplified cross-sectional view of a portion of the calibration tool after metalization, according to an embodiment of the present invention.

FIG. 6 is a simplified cross-sectional view of a portion of the calibration tool 500 after further processing, according to an embodiment of the present invention. In an embodiment, the calibration tool 500 may be metalized by coating a metal layer 636 on some or all of the known predetermined predictable pattern 526 and/or the substrate 528. For example, the metal layer 636 may be formed by sputtering a 5 nm layer of Cr. Both metal and non-metal materials can be used, for example the coating can be the sputtering layer of Si, $SiO_2$ or carbon, etc.

Figure 7:
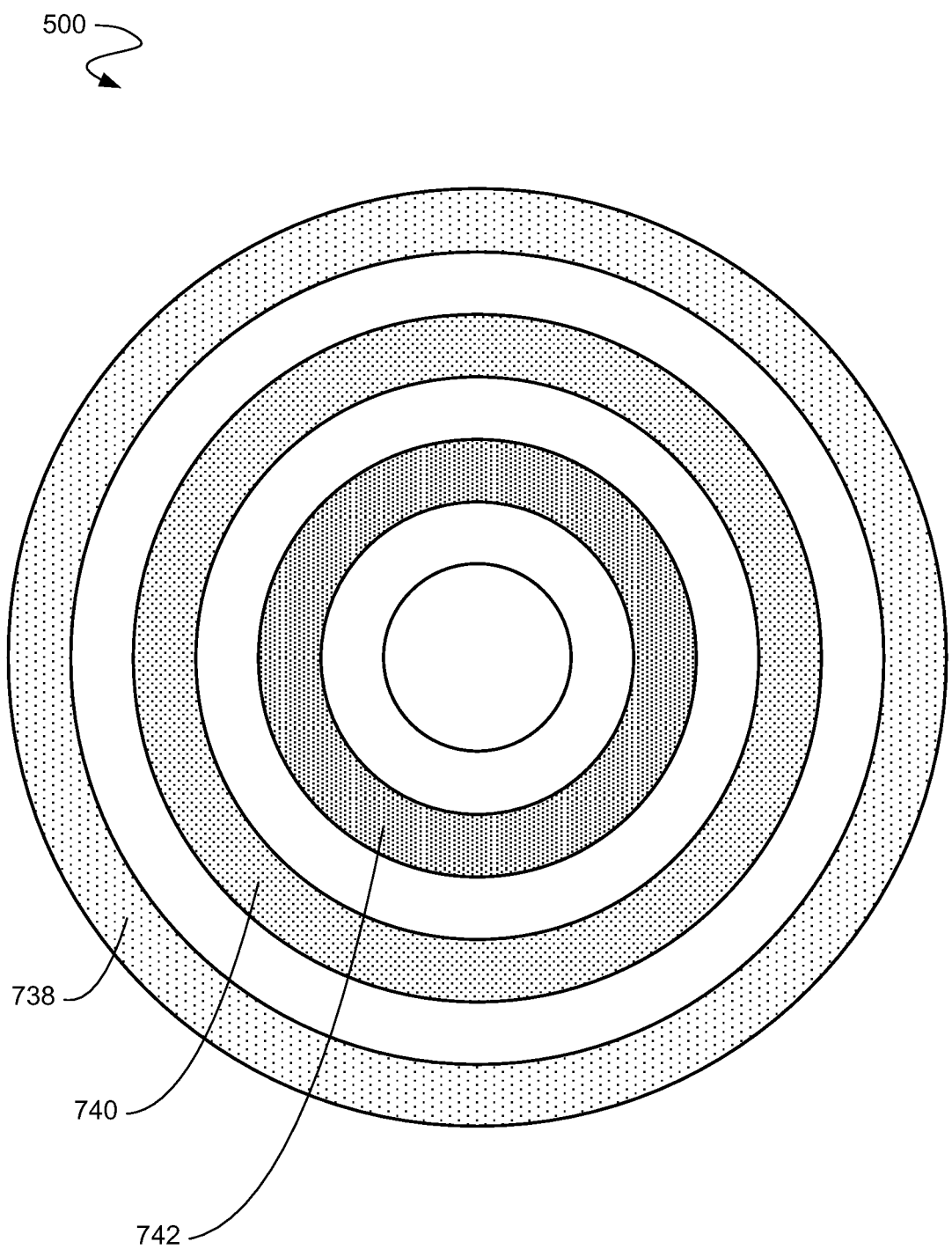
FIG. 7 is a simplified plan view of the calibration tool, according to an embodiment of the present invention.

FIG. 7 is a simplified plan view of the calibration tool 500, according to an embodiment of the present invention. The calibration tool 500 may include a number of known patterns with varying designs, each for different calibrations. For example, a first band 738 may be formed at a radius of 21 mm to 21.5 mm. The first band 738 may include holes or pillars with a diameter of 160 nm, and spacing between the holes or pillars of 40 μm. The holes or pillars may be formed to a depth or height of 60 nm.

A second band 740 may be formed at a radius of 20 mm to 20.5 mm. The second band 740 may include holes or pillars with a diameter of 120 nm, and spacing between the holes or pillars of 40 μm. The holes or pillars may be formed to a depth or height of 60 nm. A third band 742 may be formed at a radius of 19 mm to 19.5 mm. The third band 742 may include holes or pillars with a diameter of 180 nm, and spacing between the holes or pillars of 40 μm. The holes or pillars may be formed to a depth or height of 60 nm.

A fourth band (not shown) may be formed at a radius of 18 mm to 18.5 mm. The fourth band may include holes or pillars with a diameter of 50 nm, and spacing between the holes or pillars of 40 μm. Thus, the calibration tool may include one or more bands with a number of holes or pillars. The holes or pillars may have a variety of diameters, a variety of spacing between the holes or pillars, and/or a variety of depths and heights of the holes or pillars. In various embodiments, the bands may include patterns other than holes and pillars, e.g. spherical shapes, that can be formed by the processes described above and seen by the optical equipment 800 (See FIG. 8).

Figure 8:
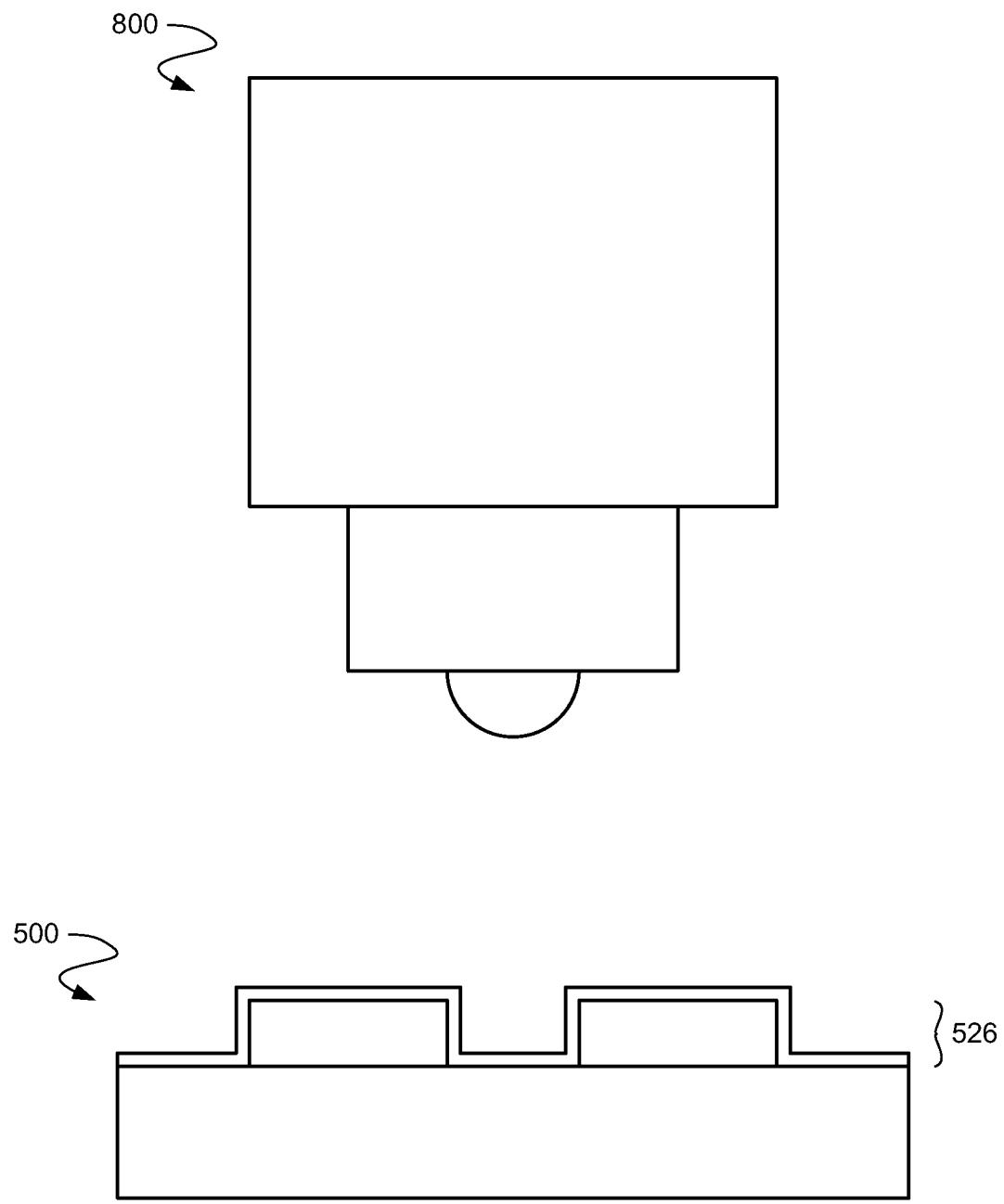
FIG. 8 is a simplified cross-sectional view of the calibration tool and the optical equipment.

FIG. 8 is a simplified cross-sectional view of the calibration tool 500 and the optical equipment 800. In an embodiment the optical equipment 800 may be Candela that optically read the known predetermined predictable pattern 526 on the calibration tool 500. Because the known predetermined predictable pattern 526 is already known prior to the optical equipment 800 imaging the calibration tool 500, the readings taken by the optical equipment 800 may be compared to the known predetermined predictable pattern 526. Adjustments may then be made to the optical equipment 800 for calibration. In some embodiments, the readings from a number of Candela may be used to calibrate the Candela to each other.

The calibration tool 500 may be subject to contamination due to mishandling or use. For example, dust or other particles may settle on or get stuck to the surface of the calibration tool 500. In such cases, the known predetermined predictable pattern 526 may be used to filter readings that include contamination. For example, the known predetermined predictable pattern 526 allows, for instance, a user, a program, or the optical equipment to know what the image that is being produced is supposed to look like. Any unexpected features may therefore be removed or ignored, for example by subtracting one image from the other image.

In some embodiments, manufacturing processes may produce a "fishnet" effect (e.g. a region including a pattern that contaminates the readings and resembles a fishnet) to be read by the optical equipment 800. Again, the known predetermined predictable pattern 526 may be used to filter out and remove the "fishnet" effect.

Figure 9:
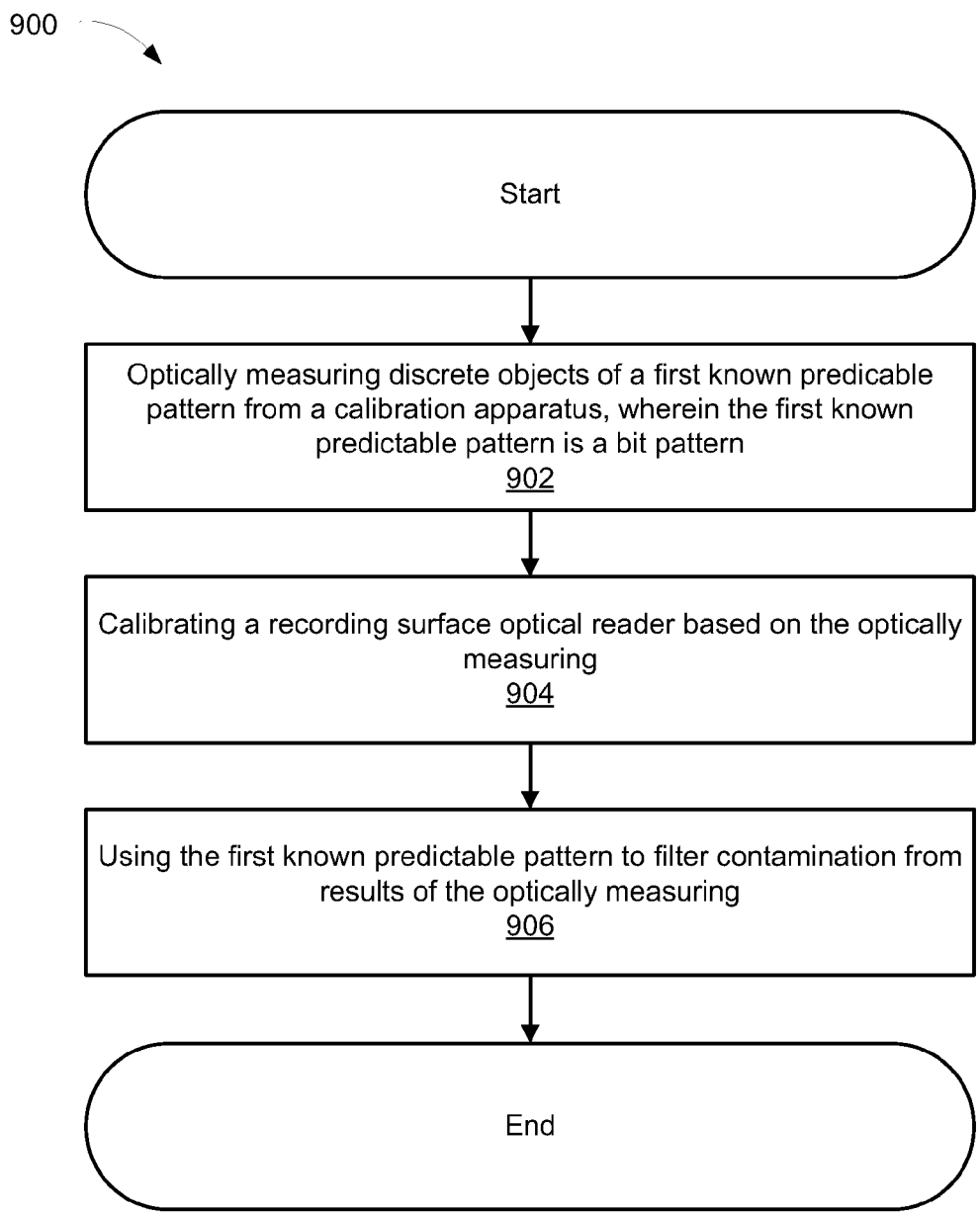
FIG. 9 depicts a flowchart of a process of calibrating optical measuring equipment, according to an embodiment of the present invention.

FIG. 9 depicts a flowchart 900 of a process of calibrating optical measuring equipment, according to an embodiment of the present invention. In block 902, discrete objects of a first known predictable pattern are optically measured from a calibration apparatus, wherein the first known predictable pattern is a bit pattern. For example, in FIG. 8 the optical equipment, e.g. Candela, scan and measure the surface of the calibration tool. The calibration tool may be a bit patterned media disk (FIG. 7) that has a known pattern imprinted on the disk using processes for forming bit patterned media (FIG. 1-FIG. 6).

In an embodiment, the optically measuring includes optically measuring the bit pattern from a bit patterned media disk. For example, in FIG. 7 the Candela looks at the surface of the bit patterned media disk. The Candela then records the known pattern from the bit patterned media disk.

In some embodiments, the optically measuring includes optically measuring a known predictable pattern of raised surfaces. For example, in FIG. 5 the known predetermined predictable pattern includes the pillars. In FIG. 7 the pillars may be measured by the Candela. In various embodiments, the optically measuring includes optically measuring a known predetermined predictable pattern of depressions.

In block 904, a recording surface optical reader is calibrated based on the optically measuring. For example, in FIG. 8 one or more optical equipment scan and measure the known predetermined predictable pattern on the bit pattern media disk. The optical equipment are then calibrated to one another and to the known predetermined predictable pattern based on their measuring of the known predetermined predictable pattern.

In some embodiments, the calibrating a recording surface optical reader includes calibrating a Candela tool. For example, in FIG. 8 one or more Candela scan the known pattern. The Candela are calibrated based on comparing their scans with records of the known pattern, e.g. the expected scan.

In block 906, the first known predictable pattern is used to filter contamination from results of the optically measuring. For example, in FIG. 8 the known pattern on the calibration tool is scanned by the Candela. Sometimes, the calibration tool may pick up contamination due to use or mishandling. For example, dust or other particles may settle on or get stuck to the surface of the calibration tool. In such cases, the known pattern may be used to filter readings that include contamination. For example, the known pattern allows a user, a program, or the optical equipment to know what the image that is being produced is supposed to look like. Therefore, any unexpected features may be removed or ignored.

In further embodiments, discrete objects of a second known predictable pattern are optically measured from the calibration apparatus, wherein the second known pattern is a bit pattern, and wherein further the calibrating comprises calibrating the recording surface optical reader based on the optically measuring the first known predictable pattern and the second known predictable pattern. For example, in FIG. 8 a number of Candela (including a first and second Candela) may scan and measure the known pattern on the bit pattern media disk. The known pattern is a bit pattern that may be formed using process for forming bit patterned media (FIG. 1-FIG. 6). The Candela are then calibrated to one another and to the known pattern based on their measuring of the known pattern. In some embodiments, a number of known patterns may be formed on one or more bit patterned media disks (FIG. 7).

In further embodiments, the calibrating may produce a calibrated recording optical reader, and the calibrated recording optical reader may be used to measure recording media surfaces for defects therein. For example, in FIG. 8 the Candela may first calibrated and then used to scan the surfaces of other media for defects. This is illustrated during the fabrication of recording media. As layers of the recording media are formed, Candela may be used to scan the surfaces for defects, quality control, etc.

Figure 10:
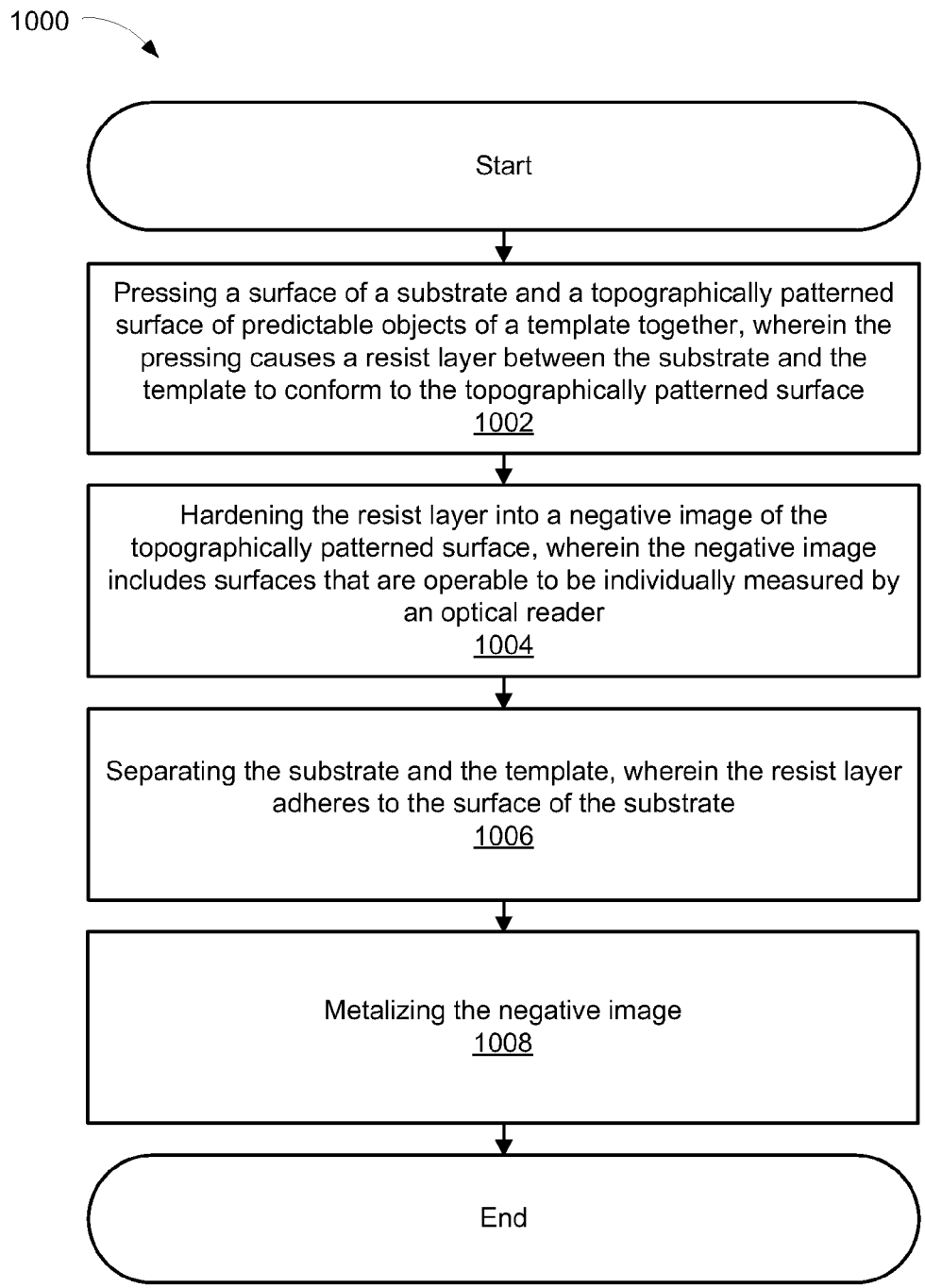
FIG. 10 depicts a flowchart of a process of forming a calibration tool, according to some embodiments of the present invention.

FIG. 10 depicts a flowchart 1000 of a process of forming a calibration tool, according to some embodiments of the present invention. In a block 1002, a surface of a substrate and a topographically patterned surface of predictable objects of a template are pressed together. For example, in FIG. 4 and FIG. 5 the template may be used to form the calibration tool using imprint lithography. A resist is coated onto a substrate, and the template is pressed into the resist forming the known pattern.

In a block 1004, the resist layer is hardened into a negative image of the topographically patterned surface, wherein the negative image includes surfaces that are operable to be individually measured by an optical reader. For example, in FIG. 4 and FIG. 5 the resist is hardened, for example by thermal or UV energy, and the template is removed, leaving the known pattern on the substrate. The known pattern can then be measured by an optical reader, e.g. Candela (FIG. 8).

In some embodiments, the negative image includes objects that are operable to be individually measured by a Candela tool for calibration thereof. For example, in FIG. 8 one or more Candela may scan and measure the known pattern on the bit pattern media disk. The Candela are then calibrated based on their measuring of the known pattern.

In various embodiments, the objects are raised surfaces. For example, in FIG. 5 the known pattern includes the pillars. In FIG. 7 the pillars may be measured by the Candela. In further embodiments, the objects are depressions. In FIG. 7 the holes may be measured by the Candela.

In a block 1006, the substrate and the template are separated, wherein the resist layer adheres to the surface of the substrate. For example, in FIG. 4 and FIG. 5 the template is removed, and the resist layer remains on the substrate as a negative image of the template.

In a block 1008, the negative image is metalized or protected with a surface layer. For example, in FIG. 6 the calibration tool may be metalized by coating a metal layer on the known pattern and the substrate. In some embodiments, a layer of Cr is sputtered overlying the resist layer and the substrate. For example, in FIG. 6 the metal layer may be formed by sputtering a 5nm layer of Cr or other materials such as Si, $SiO_2$ and carbon, etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A method comprising:
   optically measuring discrete objects of a first known predictable pattern from a calibration apparatus, wherein said first known predictable pattern is a bit pattern; and
   calibrating a recording surface optical reader based on said optically measuring.

2. The method of claim 1 further comprising using said first known predictable pattern to filter contamination from results of said optically measuring.

3. The method of claim 1 wherein said calibrating a recording surface optical reader comprises calibrating a Candela tool.

4. The method of claim 1 wherein said optically measuring comprises optically measuring said bit pattern from a bit patterned media disk.

5. The method of claim 1 wherein said optically measuring comprises optically measuring a known predictable pattern of raised surfaces.

6. The method of claim 1 wherein said optically measuring comprises optically measuring a known predictable pattern of depressions.

7. The method of claim 1 further comprising:
optically measuring discrete objects of a second known predictable pattern from said calibration apparatus, wherein
said second known pattern is a bit pattern, and wherein
said calibrating comprises calibrating said recording surface optical reader based on said optically measuring said first known predictable pattern and said second known predictable pattern.

8. The method of claim 1:
wherein said calibrating produces a calibrated recording optical reader, and
further comprising using said calibrated recording optical reader to measure recording media surfaces for defects therein.

9. An apparatus comprising:
a substrate; and
a first predetermined predictable bit pattern of objects on said substrate,
wherein said objects are operable to be individually measured by a recording surface optical reader and wherein said recording surface optical reader comprises a Candela tool.

10. The apparatus of claim 9 wherein said first predetermined predictable bit pattern is operable to filter contamination detected by said recording surface optical reader.

11. The apparatus of claim 9 wherein said substrate is operable to be used for a bit patterned media disk.

12. The apparatus of claim 9 wherein said objects are raised surfaces or depressed surfaces.

13. An apparatus comprising:
means for optically measuring discrete objects of a first known predictable pattern from a calibration apparatus, wherein said first known predictable pattern is a bit pattern; and
means for calibrating a recording surface optical reader based on said optically measuring.

14. The apparatus of claim 13 further comprising means for using said first known predictable pattern to filter contamination from results of said optically measuring.

15. The apparatus of claim 13 wherein said means for optically measuring comprises means for optically measuring said bit pattern from a bit patterned media disk.

16. The apparatus of claim 13 wherein said means for optically measuring comprises means for optically measuring a known predictable pattern of raised surfaces.

17. The apparatus of claim 13 wherein said means for optically measuring comprises means for optically measuring a known predictable pattern of depressions.

18. The apparatus of claim 13 further comprising:
means for optically measuring discrete objects of a second known predictable pattern from said calibration apparatus, wherein
said second known pattern is a bit pattern, and wherein
said means for calibrating comprises means for calibrating said recording surface optical reader based on said optically measuring said first known predictable pattern and said second known predictable pattern.

19. An apparatus comprising:
a substrate;
a first predetermined predictable bit pattern of first objects on said substrate, wherein said first objects are operable to be individually measured by a recording surface optical reader; and
a second predetermined predictable bit pattern of second objects on said substrate, wherein said second objects are operable to be individually measured by said recording surface optical reader.

20. The apparatus of claim 19, wherein said recording surface optical reader comprises a Candela tool.

* * * * *